(12) United States Patent
Jaya et al.

(10) Patent No.: US 11,356,869 B2
(45) Date of Patent: Jun. 7, 2022

(54) PRESERVATION OF POLICY AND CHARGING FOR A SUBSCRIBER FOLLOWING A USER-PLANE ELEMENT FAILOVER

(71) Applicant: Cisco Technology, Inc., San Jose, CA (US)

(72) Inventors: Sanjeev Panem Jaya, Pune (IN); Anand Alshi, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 135 days.

(21) Appl. No.: 16/531,567

(22) Filed: Aug. 5, 2019

(65) Prior Publication Data

US 2020/0245163 A1  Jul. 30, 2020

Related U.S. Application Data

(63) Continuation of application No. 16/262,353, filed on Jan. 30, 2019, now Pat. No. 10,448,268.

(51) Int. Cl.
*H04W 24/04* (2009.01)
*H04L 47/2441* (2022.01)
(Continued)

(52) U.S. Cl.
CPC ......... *H04W 24/04* (2013.01); *H04L 47/2441* (2013.01); *H04L 47/2475* (2013.01); *H04L 47/2483* (2013.01)

(58) Field of Classification Search
None
See application file for complete search history.

(56) References Cited

U.S. PATENT DOCUMENTS 9,544,939 B2   1/2017   Avula et al.
9,762,402 B2   9/2017   Batz et al.
(Continued)

FOREIGN PATENT DOCUMENTS

CN        103533525 B    1/2014
WO    2011099523 A1    8/2011

OTHER PUBLICATIONS

Rob Sherwood. FlowVisor: A Network Virtualization Layer (Year: 2009).*

(Continued)

*Primary Examiner* — Andre Tacdiran
(74) *Attorney, Agent, or Firm* — Edell, Shapiro & Finnan, LLC

(57) ABSTRACT

Techniques that provide for the preservation of policy and charging for a subscriber following a user-plane element failover are described herein. In one embodiment, a method includes receiving, by a user-plane element, at least one data packet of a packet flow associated with a subscriber, wherein the at least one data packet is are received after the user-plane element has recovered from a failure; determining, by the user-plane element, whether restoration information associated with the packet flow is stored at the user-plane element; and applying one or more policies to the packet flow based on a determination that the restoration information associated with the packet flow is stored at the user-plane element, wherein the restoration information comprises a rule associated with the packet flow.

20 Claims, 9 Drawing Sheets

(51) Int. Cl.
*H04L 47/2475* (2022.01)
*H04L 47/2483* (2022.01)

(56) References Cited

U.S. PATENT DOCUMENTS

| | | | |
|---|---|---|---|
| 2003/0152084 | A1 | 8/2003 | Lee et al. |
| 2006/0233164 | A1* | 10/2006 | Brahmaroutu .......... H04L 41/08 370/384 |
| 2008/0002579 | A1 | 1/2008 | Lindholm et al. |
| 2008/0123655 | A1 | 5/2008 | Kim et al. |
| 2010/0103837 | A1 | 4/2010 | Jungck et al. |
| 2011/0211445 | A1* | 9/2011 | Chen ...................... H04L 45/42 370/221 |
| 2013/0114460 | A1 | 5/2013 | Rubio et al. |
| 2014/0160924 | A1* | 6/2014 | Pfautz ................. H04L 47/2483 370/235 |
| 2015/0181607 | A1 | 6/2015 | Csaszar et al. |
| 2015/0282242 | A1* | 10/2015 | Merino Vazquez .. H04L 67/306 370/221 |
| 2015/0350077 | A1* | 12/2015 | Durrani .............. H04L 41/0226 709/225 |
| 2016/0085641 | A1 | 3/2016 | Nagasubramaniam et al. |
| 2016/0344640 | A1 | 11/2016 | Söderlund et al. |
| 2017/0289099 | A1* | 10/2017 | Luo ..................... H04L 61/6059 |
| 2018/0131620 | A1* | 5/2018 | Su ....................... H04L 47/2441 |
| 2019/0069199 | A1* | 2/2019 | Yan .................... H04W 28/0268 |
| 2019/0200266 | A1* | 6/2019 | Jun ................... H04W 36/0027 |
| 2019/0261211 | A1* | 8/2019 | Wu ...................... H04L 47/2441 |
| 2020/0059992 | A1 | 2/2020 | Skog et al. |
| 2020/0100319 | A1* | 3/2020 | Talebi Fard ............ H04W 8/02 |
| 2020/0145432 | A1* | 5/2020 | Verma ................. H04L 43/028 |
| 2020/0259741 | A1* | 8/2020 | Park ................... H04L 12/4641 |
| 2020/0267077 | A1 | 8/2020 | Williams et al. |
| 2020/0359255 | A1* | 11/2020 | Yan .................... H04L 47/2433 |
| 2020/0374741 | A1* | 11/2020 | Li ..................... H04W 72/1257 |

OTHER PUBLICATIONS

Open Networking Foundation. OpenFlow Switch Specication Version 1.0.0. ONF TS-001 (Year: 2009).*
International Search Report and Written Opinion in counterpart International Application No. PCT/US2020/014730, dated May 6, 2020, 13 pages.
3GPP Organizational Partners, "3rd Generation Partnership Project; Technical Specification Group Core Network and Terminals; Restoration procedures (Release 15)", 3GPP TS 23.007 V15.1.0, Sep. 2018, 107 pages.
3GPP Organizational Partners, "3rd Generation Partnership Project; Technical Specification Group Services and System Aspects; System Architecture for the 5G System; Stage 2 (Release 15)", 3GPP TS 23.501 V15.3.0, Sep. 2018, 226 pages.
3GPP Organizational Partners, "3rd Generation Partnership Project; Technical Specification Group Core Network and Terminals; 5G System; Restoration Procedures (Release 15)", 3GPP TS 23.527 V15.0.0, Sep. 2018, 16 pages.
3GPP Organizational Partners, "3rd Generation Partnership Project; Technical Specification Group Core Network and Terminals; Policy and Charging Control (PCC); Reference points (Release 15)", 3GPP TS 29.212 V15.4.0, Sep. 2018, 284 pages.
3GPP Organizational Partners, "3rd Generation Partnership Project; Technical Specification Group Core Network and Terminals; Interface between the Control Plane and the User Plane Nodes; Stage 3 (Release 15)", 3GPP TS 29.244 v15.3.0, Sep. 2018, 189 pages.
3GPP Organizational Partners, "Universal Mobile Telecommunications System (UMTS); LTE; Policy and Charging Control (PCC); Reference points (3GPP TS 29.212 version 14.3.0 Release 14)", ETSI TS 129 212 V14.3.0, Apr. 2017, 286 pages.
3GPP, Digital cellular telecommunications system (Phase 2+) (GSM); Universal Mobile Telecommunications System (UMYS); LTE; Restoration procedures (3GPP TS 23.007 version 14.3.0 Release 14), ETSI TS 123 007 V14.3.0, Jul. 2017, 108 pages.
Peyman Talebi Fard et al., "Network Initiated Release Assistance Indication", U.S. Appl. No. 62/736,238, filed Sep. 25, 2018, 104 pages.

* cited by examiner

FIG. 2A

RESTORE FLOW IE 200 DESCRIPTION

| INFORMATION ELEMENTS | P | CONDITION / COMMENT | APPL. | | | | IE TYPE |
| --- | --- | --- | --- | --- | --- | --- | --- |
| | | | Sxa | Sxb | Sxc | N4 | |
| RESTORE FLOW | O | THIS IE MAY BE PRESENT IF USER PLANE SUPPORTS FLOW RECOVERY AND A NEW FLOW CLASSIFICATION IS COMPLETE. SEVERAL IEs OF THE SAME TYPE MAY BE PRESENT TO REPORT MULTIPLE FLOWS. | - | x | x | x | RESTORE FLOW |

RESTORE FLOW IE 200

FIG. 2B

RESTORE FLOW IE TYPE = xx (DECIMAL)
LENGTH = n

| | | | | | | | |
| --- | --- | --- | --- | --- | --- | --- | --- |
| OCTET 1 AND 2 | | | | | | | |
| OCTETS 3 AND 4 | | | | | | | |
| INFORMATION ELEMENTS | P | CONDITION / COMMENT | APPL. | | | | IE TYPE |
| | | | Sxa | Sxb | Sxc | N4 | |
| FLOW INFORMATION | M | THIS IE SHALL UNIQUELY IDENTIFY THE IP FLOW AMONG ALL THE FLOWS HANDLED BY THE USER-PLANE ELEMENT | - | x | x | x | FLOW INFORMATION |
| RULE MATCHED | M | THIS IE SHALL INDICATE THE LAST RULE MATCHED | - | x | x | x | RULE MATCHED |
| APPLICATION IDENTIFIED | O | THIS IE SHALL INDICATE THE LAST APPLICATION IDENTIFIED | - | x | x | x | APPLICATION IDENTIFIED |
| APPLICATION INSTANCE IDENTIFIER | C | THIS IE SHALL INDICATE THE APPLICATION INSTANCE FOR THE LAST APPLICATION IDENTIFIED | - | x | x | x | APPLICATION INSTANCE IDENTIFIER |

210 INFORMATION ELEMENTS
220 FLOW INFORMATION
230 RULE MATCHED / APPLICATION IDENTIFIED
240 APPLICATION INSTANCE IDENTIFIER 202, 204

FLOW INFORMATION IE 210

| OCTETS | BITS | | | | | | | |
|---|---|---|---|---|---|---|---|---|
| | 8 | 7 | 6 | 5 | 4 | 3 | 2 | 1 |
| 1 TO 2 | TYPE = xx (DECIMAL) | | | | | | | |
| 3 | LENGTH = n | | | | | | | |
| 4 TO n | FLOW INFORMATION (e.g., 5-TUPLE, RESTORE FLOW ID, ETC.) | | | | | | | |

212 — OCTETS column
214 — TYPE row
216 — LENGTH row

FIG. 2C

RULE MATCH IE 220

| OCTETS | BITS | | | | | | | |
|---|---|---|---|---|---|---|---|---|
| | 8 | 7 | 6 | 5 | 4 | 3 | 2 | 1 |
| 1 TO 2 | TYPE = xx (DECIMAL) | | | | | | | |
| 3 | LENGTH = n | | | | | | | |
| 4 TO n | RULE NAME | | | | | | | |

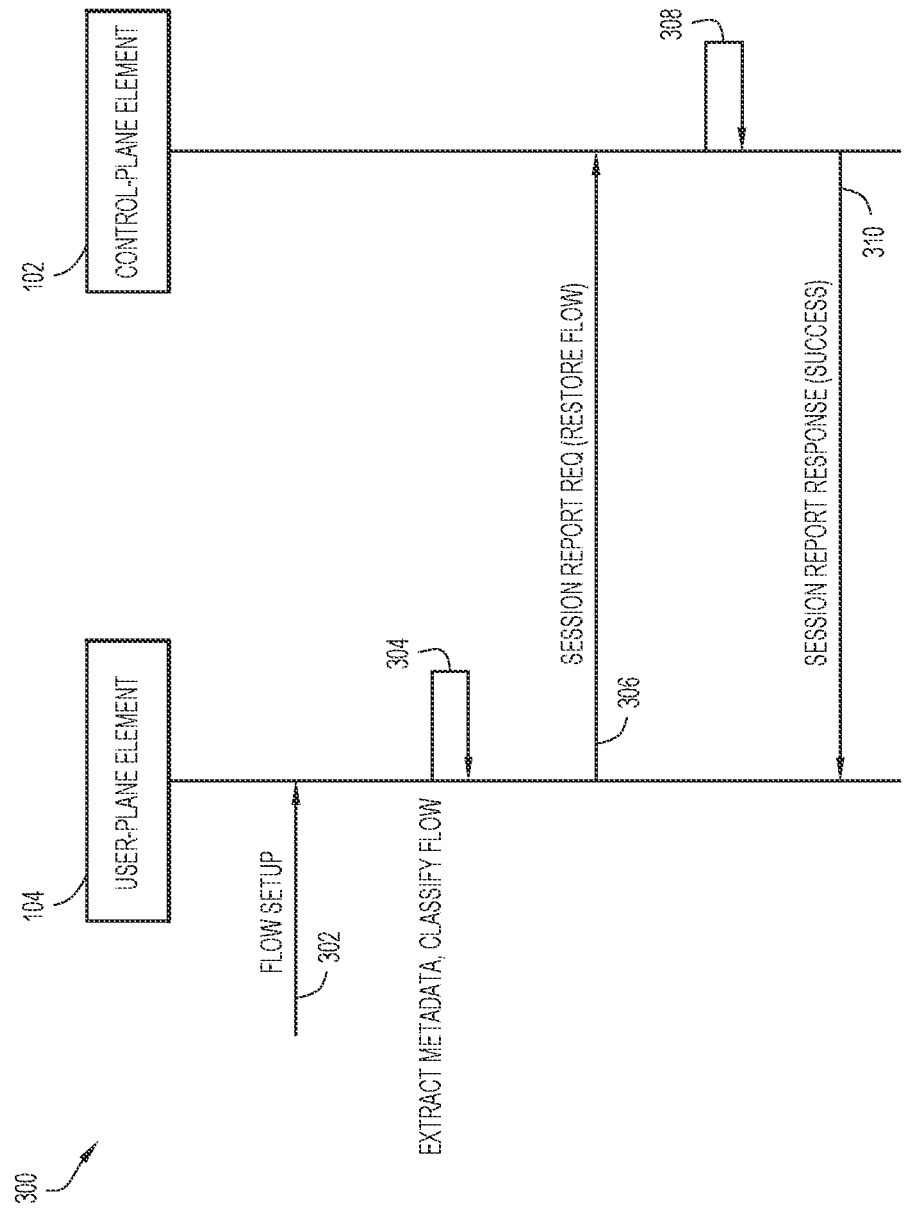

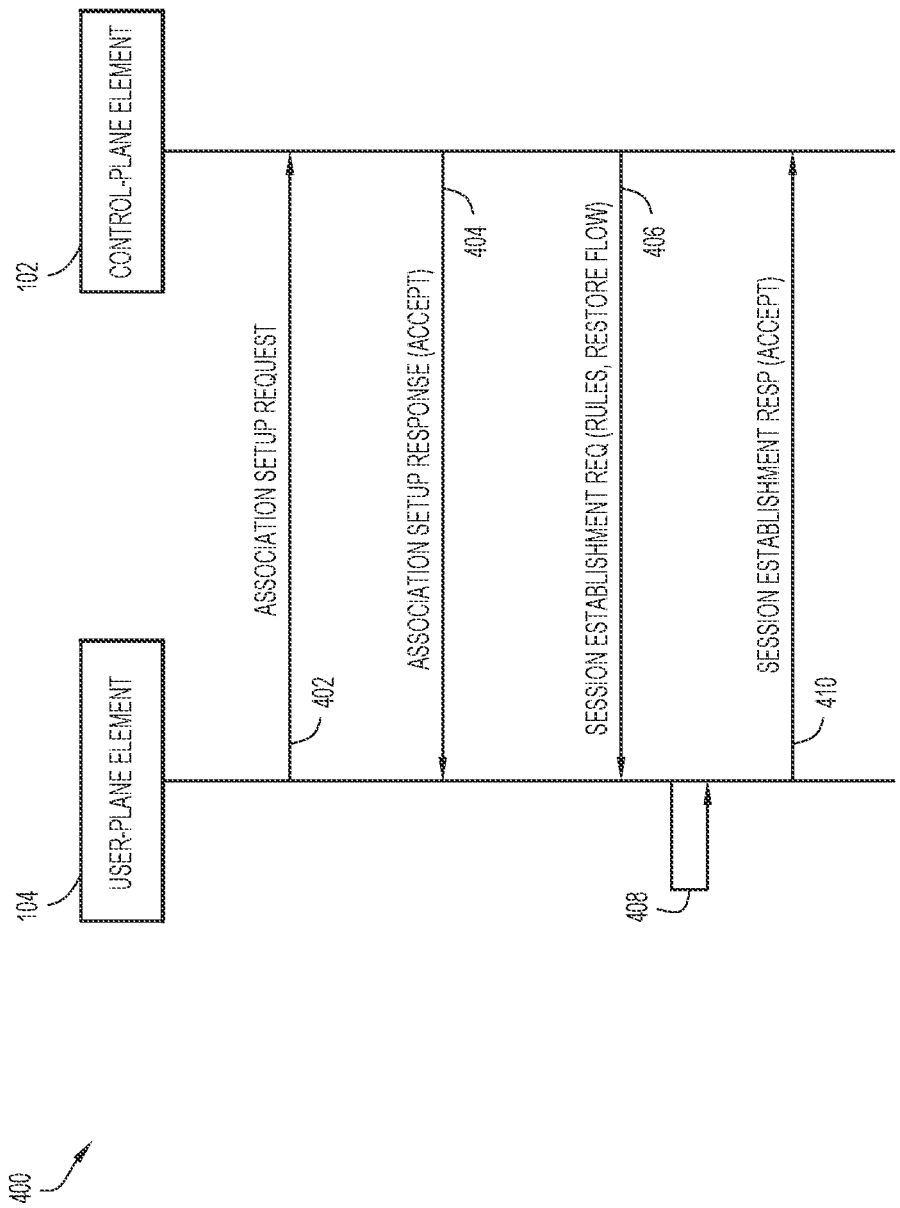

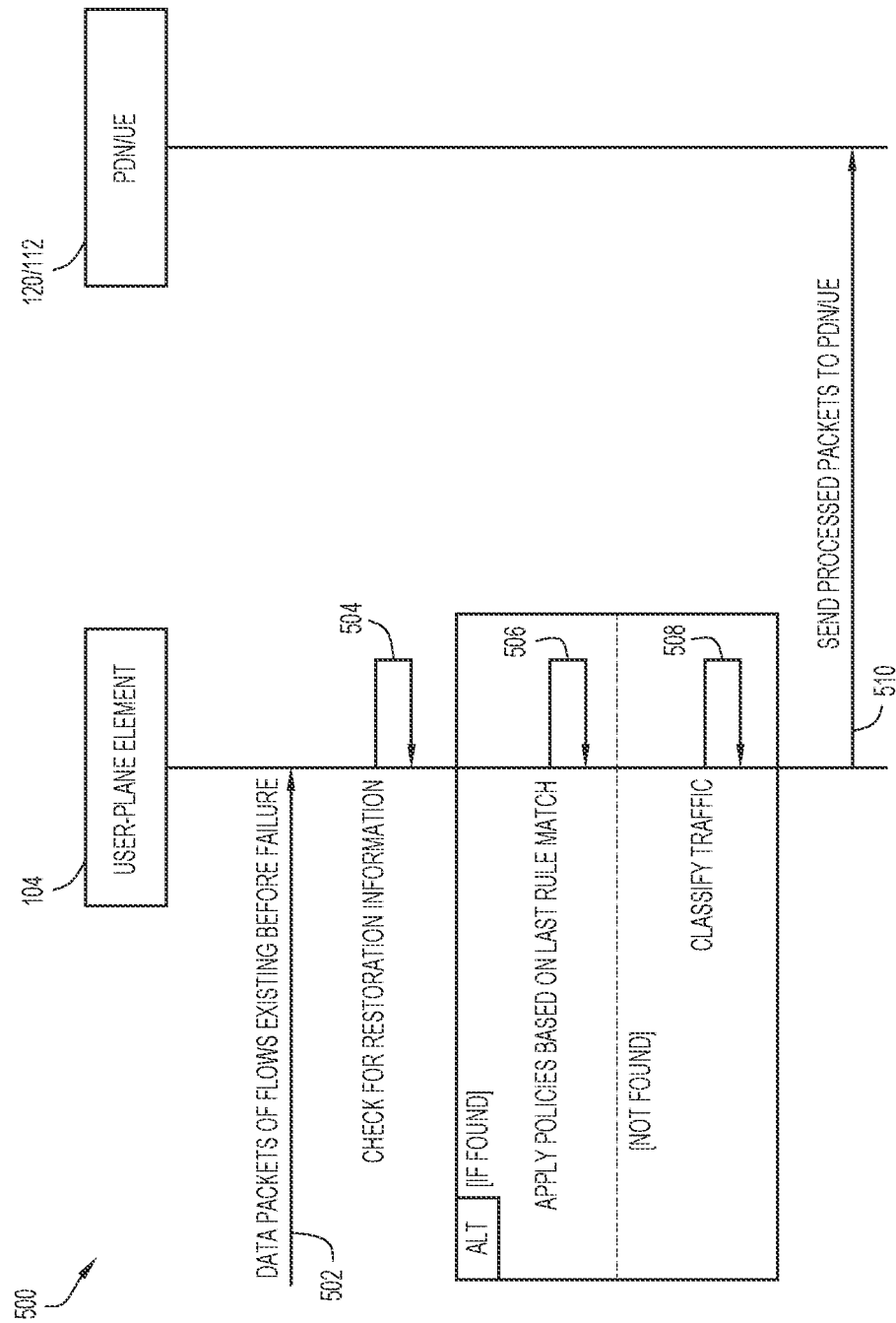

PRESERVATION OF POLICY AND CHARGING FOR A SUBSCRIBER FOLLOWING A USER-PLANE ELEMENT FAILOVER

CROSS-REFERENCE TO RELATED APPLICATION

This application is a continuation of and claims benefit to U.S. patent application Ser. No. 16/262,353, filed Jan. 30, 2019, the entire contents of which are incorporated herein by reference.

TECHNICAL FIELD

The present disclosure relates to a communication system, in particular, to the preservation of policy and charging for a subscriber following a user-plane element failover.

BACKGROUND

Mobile networking architectures have grown increasingly complex in communication environments. In some cases, mobile network architectures can be implemented using Software Defined Network (SDN) techniques in order to deploy Control and User Plane Separation (CUPS) architectures in which the data path and the control path for a mobile network are split across two planes, a data-plane and a control-plane. As the number of user equipment increases and as CUPS architectures become more prevalent for mobile networking deployments, efficient management of communication resources becomes more critical. Accordingly, there are significant challenges in facilitating CUPS architectures for a network environment.

BRIEF DESCRIPTION OF THE DRAWINGS

FIGS. 2A-2F are simplified diagrams illustrating example details associated with various information elements that may be used to communicate information to provide for the preservation of policy and charging for a subscriber following a user-plane element failover, according to an example embodiment.

FIG. 3 is a simplified sequence diagram illustrating example interactions and operations associated with a flow classification, according to an example embodiment.

FIG. 4 is a simplified sequence diagram illustrating example interactions and operations associated with a restoration process for a user-plane element following a failover, according to an example embodiment.

FIG. 5 is a simplified sequence diagram illustrating example interactions and operations associated with receiving a flow at a user-plane element following a failover, according to an example embodiment.

DESCRIPTION OF EXAMPLE EMBODIMENTS

Overview

Figure 1:
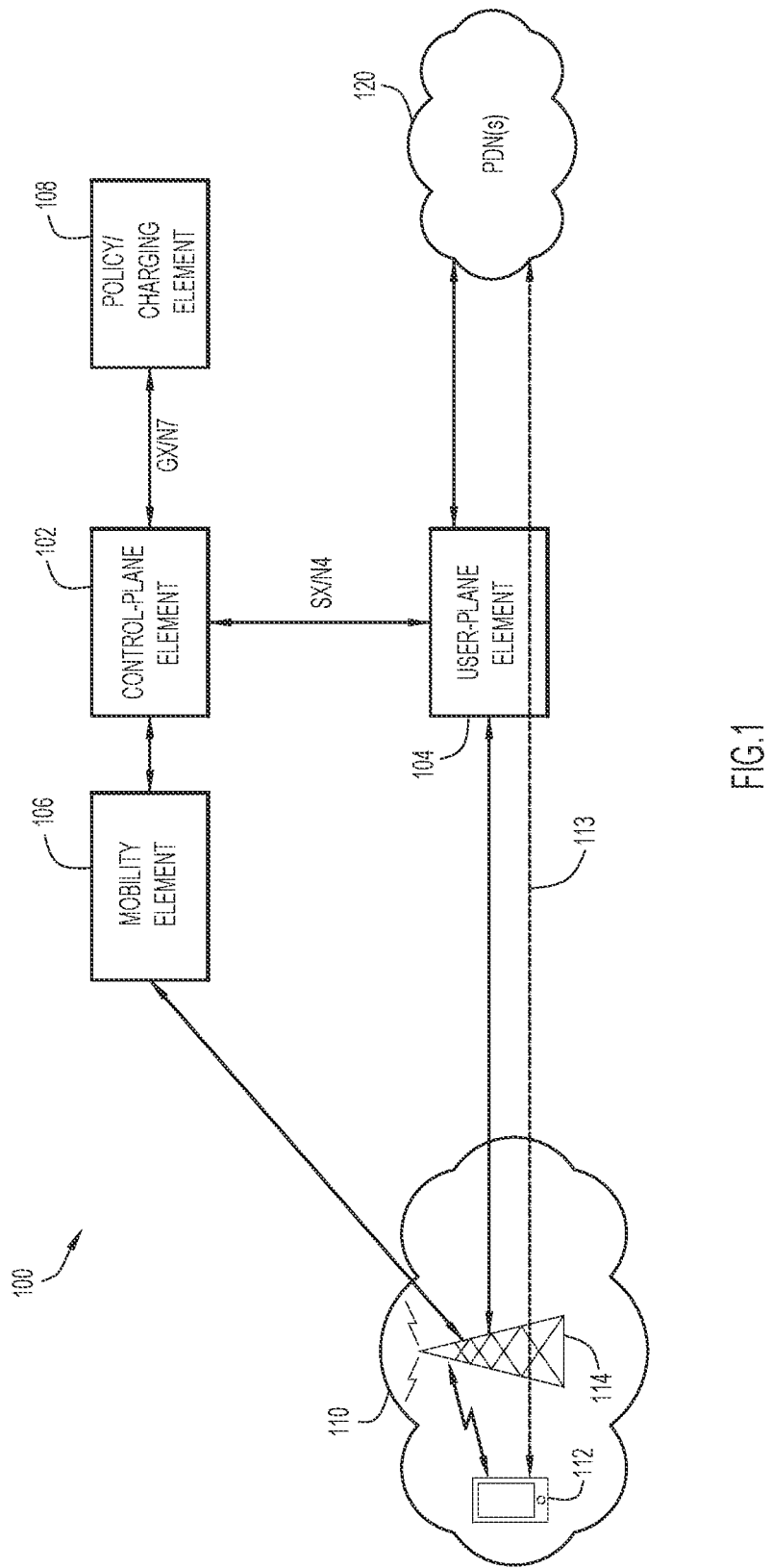
FIG. 1 is a simplified block diagram illustrating example details associated with a communication system in which techniques that provide for the preservation of policy and charging for a subscriber following a user-plane element failover may be implemented, according to an example embodiment.

In the event of a failure of a user-plane element, the handling of a subscriber's traffic may change due to the unavailability of metadata extracted as part of deep packet inspection (DPI). This can lead to under-charging or over-charging of the subscriber and/or degrade the quality of experience for the subscriber.

A solution provided herein overcomes this hurdle by providing for the ability for a user-plane element, following a failure of the element, to recover a last matched rule for the ongoing flows (which were setup prior to the failure); thereby enabling the user-plane element to apply the same treatment for the flows as before the failure. Accordingly, presented herein are techniques to provide for the preservation of policy and charging characteristics applied on subscriber data flows following a user-plane element failover (e.g., a failure). A method is provided in one example embodiment and may include receiving, by a user-plane element, at least one data packet of a packet flow associated with a subscriber, wherein the at least one data packet is received after the user-plane element has recovered from a failure; determining, by the user-plane element, whether restoration information associated with the packet flow is stored at the user-plane element; and applying one or more policies to the packet flow based on a determination that the restoration information associated with the packet flow is stored at the user-plane element, wherein the restoration information comprises a rule (e.g., the last matched rule) associated with the packet flow.

The method may further include, prior to receiving the at least one data packet, determining a classification for the packet flow at the user-plane element using a prior packet flow associated with the subscriber, wherein the classification is based on rule information stored on the user-plane element; and communicating the restoration information to a control-plane element. The restoration information may be included in a Packet Forwarding Control Protocol Session Report message communicated to the control-plane element and may include, flow information identifying one or more of: a source address, a source port, a destination address, a destination port, a protocol, and a flow identifier associated with the packet flow; and at least one of: a rule name and a rule identifier that indicates the prior rule associated with the packet flow; an application identifier that indicates an application associated with the packet flow; and an application instance identifier that associated with the application. In some cases, communicating the restoration information to the control-plane element may be based on at least one of determining that the prior packet flow is active for more than a threshold time; determining that the classification for the prior packet flow corresponds to a particular flow type for which the restoration information is to be communicated to the control-plane element; and determining that the prior packet flow is less than a maximum number of packet flows that can be restored on the user-plane element. The method may further include, after the user-plane element has recovered from the failure and prior to receiving the at least one data packet, receiving restoration information for one or more prior packet flows from a control-plane element.

Example Embodiments

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) system architectures, sometimes referred to as 4th Generation (4G)/LTE architectures, as well as 3GPP 5th Generation (5G) architectures. The following foundational information may be viewed as a basis from which the present disclosure may be properly explained.

Architectures that facilitate network communications generally rely upon three basic components: a data- or user-plane, a control-plane, and a management-plane. Typically, the user-plane carries data traffic, while the control-plane and the management-plane serve the user-plane. As referred to herein and in the claims, the term 'plane' can refer to a separation of traffic that can traverse a network.

Compute node(s) having hardware and software resources that can be abstracted into one or more logical layers can be used to facilitate building and deploying Software Defined Network (SDN) architectures for virtualized network environments. Generally, SDN architectures provide an approach to building and deploying computer networks, networking equipment, and software that separates and abstracts the control-plane (CP) and user-plane (UP) of networking systems. SDN decouples the control-plane that makes decisions about where traffic is sent from the underlying user-plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers; among others.

As referred to herein in this disclosure, the terms 'virtual machine', 'virtualized network function', and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof, or the like as described herein may execute (e.g., be instantiated to perform one or more operation(s)) via a hypervisor-based virtualization or a container-based virtualization of one or more compute node(s) using the compute node(s)' hardware (e.g., processor, memory, storage, network interfaces, etc.), software, and/or operating system for a given virtualized network environment.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual, or script data or information or any type of source or object code, or any other suitable data or information in any appropriate format that can be communicated from one point to another using electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. As referred to herein and in the claims, the terms 'packet' and 'data packet' may be used interchangeably. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IP version 6 (IPv6) addresses.

In traditional 3GPP 4G architectures, user equipment (UE) devices typically connect to a service provider network through over-the-air communications with one or more radio nodes such as evolved Node Bs (eNodeBs or eNBs), which interface with control-plane elements such as Mobility Management Entities (MMEs) and user-plane elements such as serving Gateways (SGWs) and Packet Data Network (PDN) Gateways (PGWs). As referred to herein and in the claims, the terms 'UE device', 'UE', 'subscriber', 'user', and variations thereof can be used interchangeably.

User-plane elements such as SGWs can route and forward user data packets while also acting as a mobility anchor for inter-3GPP mobility (e.g., handling mobility interfacing to other networks such as 2nd Generation (2G) and/or 3rd Generation (3G) networks) and during inter-eNodeB handoffs or handovers. Further for traditional 3GPP 4G architectures, PGWs may provide UE connectivity to external PDNs, such as the Internet, an IP Multimedia Subsystem (IMS), combinations thereof, or the like. A PGW can serve as a policy enforcement point to manage Quality of Service (QoS), flow classification, online/offline flow-based charging, data generation, shallow packet inspection, deep packet inspection (DPI), packet filtration, intercept, combinations thereof or the like. In some cases, a user-plane element such as a Traffic Detection Function (TDF) can be provided between a PGW and external PDNs. A TDF can provide functionality such as application traffic (e.g., streaming audio/video applications, peer-to-peer applications, etc.) detection and reporting for user equipment service data flows (SDFs) and other services such as, for example, gating, DPI, redirection, bandwidth limitations, combinations thereof, or the like for such traffic.

SDN concepts can be applied to a traditional 3GPP 4G architecture to enable separation of the control- and user-planes in order to implement a Control and User Plane Separation (CUPS) architecture in which the control and user paths are split across the two planes thereby creating a control-plane implemented via one or more controller element(s) and a user-plane implemented via one or more forwarding element(s) (FE(s)). For a 3GPP 4G CUPS architecture, the control-plane element(s) can include any number of control-plane SGWs (referred to herein as SGW-Cs) and control-plane PGWs (referred to herein as PGW-Cs) that manipulate the user-plane network infrastructure to facilitate end-to-end service provider network connectivity. Also for a 3GPP 4G CUPS architecture, the user-plane FE(s) can include any number of user-plane SGWs (referred to herein as SGW-Us), user-plane PGWs (referred to herein as PGW-Us), and, in some implementations, user-plane TDFs (referred to herein as TDF-Us) that can process and perform operations on subscriber (e.g., UE) traffic as the traffic passes through the service provider network. In some embodiments, functionality for the SGWs and PGWs can be combined to provide a System Architecture Evolution Gateways (SAEGWs), which can be implemented in a CUPS architecture as control-plane SAEGWs (referred to herein as SAEGW-Cs) and user-plane SAEGWs (referred to herein as SAEGW-Us). Together, the control-plane and user-plane elements can manage the forwarding of all subscriber traffic through a service provider network. Generally in a 4G CUPS architecture, the MME selects an SGW-C/PGW-C to handle a UE session.

For a 3GPP 5G architecture, control-plane elements can include, among other elements, an Access and Mobility Function (AMF), a Session Management Function (SMF) and user-plane elements can include User Plane Functions (UPFs), as defined in 3GPP standards. Generally, the AMF provides authentication, authorization, and mobility management for UEs. Generally, the SMF is responsible for session management with individual functions being supported on a per-session basis in which the SMF allocates IP addresses to UEs, and selects and controls the UPFs for data transfer. In some cases, an SMF can manage and control hundreds of UPFs. The SMF also acts as the external point for all communication related to the various services offered and enabled in the user-plane and how the policy and charging treatment for these services is applied and controlled. Other control-plane elements may be implemented, as defined in 3GPP standards. The UPFs may operate as VNFs to serve as forwarding engines for user traffic and may perform a variety of functions such as shallow packet inspection, DPI, traffic optimization and inline services such as Network Address Translation (NAT)/Firewall/Domain Name System (DNS) snooping, etc. UPFs may also provide some services analogous to PGW-Us/TDF-Us.

As referred to herein in this disclosure and in the claims, the term 'user-plane element' can be used to refer to any combination and/or type of user-plane element/node/device/function/etc. that may be provided for a 3GPP CUPS (e.g., 4G/5G/NG) architecture that provides an interface to one or more PDN(s), such as, but not limited to, a PGW-U, TDF-U, a SAEGW-U, a UPF, or the like as may be defined by 3GPP standards (e.g., for Next Generation (NG) architectures). Further as referred to herein in this disclosure, the term 'control-plane element' can be used to refer to any combination and/or type of control-plane element/node/device/function/etc. that may be provided for a 3GPP CUPS (e.g., 4G/5G/NG) architecture that may provision, control, and/or manage a user-plane element and/or UE sessions such as, but not limited to, a PGW-C, a TDF-C, a SAEGW-C, a SMF, or the like as may be defined by 3GPP standards.

As noted previously, a primary role of a user-plane element is to classify a user's traffic and enforce appropriate charging and policy actions. In order to do this, the user-plane element should be able to classify different types of traffic that is passed through it. One of the methods that a user-plane element may use to identify and classify Layer 7 (L7) traffic of a user is by using deep packet inspection (DPI). As referred to herein and in the claims, the terms 'flow', 'IP flow', 'packet flow', 'traffic', and variations thereof can be used interchangeably to refer to a sequence or stream of packets that can be identified using one or more techniques, as discussed herein.

As part of DPI, the user-plane element extracts a lot of metadata from the data packets and uses it to classify the traffic. The extracted metadata could contain the HyperText Transfer Protocol (HTTP) Uniform Resource Locator (URL), Server Name Indication (SNI) exchanged as part of a Transport Layer Security (TLS) handshake, the HTTP transaction state, etc. The user-plane element should see the packets of a flow from the time it is setup in order to be able to extract such kinds of information.

In case of a user-plane element failure, also referred to herein as a failover, the extracted metadata information is lost. For ongoing flows, the user-plane element will be unable to extract any such data as the flow setup and the initial handshake has already been done on that flow. Hence, these flows can only be classified against Layer 3 (L3)/Layer 4 (L4) rules thereby causing discrepancies in charging actions (e.g., different levels of charging for different rules/applications) and/or policy actions (e.g., different Quality of Service (QoS) guarantees, minimum/maximum bit rates, etc. for different rules/applications). Since these flows are treated differently when compared to the treatment applied for them before the user-plane element failure, the subscriber's experience may be degraded and/or impacted. If differential charging is used by a network operator and/or service provider, this can also lead to under-charging or over-charging the subscriber.

For example, consider a scenario in which a subscriber is streaming a movie or watching the Super bowl. The classification of such traffic is usually done via DPI based on L7 information extracted from the traffic. This traffic may be treated differently than the other traffic and, in some cases, a network operator and/or service provider may also choose to prioritize this traffic by setting up a dedicated bearer for the traffic. If a user-plane element failure happens in-between extracting the information and setting up the dedicated bearer, in the absence of the extracted L7 information, this traffic will be treated as normal traffic and the policies applied post-user-plane element recovery will differ. This can lead to under-charging or over-charging of the subscriber and/or degrade the quality of experience for the subscriber.

The information extracted from traffic is usually quite large and, with the number of flows that are expected to be supported by user-plane elements, storing and retrieving this information is difficult within the expected service outage thresholds. Since the extracted metadata information is specific to a flow or a group of flows, the extracted metadata information is local to the flows and is flushed from the user-plane element once the flow is terminated. The extracted metadata information is separate from the subscriber's session state information such as, but not limited to, Session ID, rules installed for the subscriber, charging thresholds for volume/time, current usage counters, etc. As referred to herein, the terms 'extracted metadata information', 'extracted information', 'extracted data', 'extracted metadata', 'metadata information', and variations thereof can be used interchangeably.

The control-plane element has information of various policies and/or rules that are provisioned or installed on the user-plane element and hence, in the event of a user-plane element failure, these can be restored at the user-plane element. However the information that is extracted at the user-plane element as part of packet analysis is not known at the control-plane and, hence, cannot be restored as part of normal restoration/recovery procedures.

The user-plane element is expected to support a large number of flows, usually in the order of a few millions. Preserving and restoration of such a huge amount of extracted data could increase the time taken to restore services in the event of a failure.

Example embodiments described herein provide techniques to overcome these hurdles and ensure that the ongoing flows are treated in the same way with regard to charging and/or policy actions following a user-plane element failure as before the user-plane element failure. In at least one embodiment, the challenge of recovering a large amount of extracted information for each flow is overcome by recovering any combination of rule names, application identifiers, and/or application instance identifiers for flows, as the configured policies for each rule and corresponding applications, if applicable, are already configured on the user-plane element during instantiation or restoration. In some embodiments, techniques discussed herein also allow a network operator and/or service provider to minimize the number of messages on the Sx/N4 interface (between a user-plane element and a control-plane element) by selecting flows based on their life (e.g., active for configured amount of time), by the content type, among other criteria.

Referring to FIG. 1, FIG. 1 is a simplified block diagram illustrating example details associated with a communication system 100 in which techniques that provide for the preservation of policy and charging characteristics following a user-plane element failover may be implemented, according to an example embodiment. In at least one embodiment, communication system 100 may include a Radio Access Network (RAN) 110, a control-plane element 102, a user-plane element 104, a mobility element 106, and a policy and charging element 108 (referred to herein as 'policy/charging element 108'). In at least one embodiment, RAN 110 may include a RAN element 114 that enables over-the-air RF communications with at least one UE 108. Also shown in FIG. 1 are one or more PDN(s) 120.

In this embodiment, RAN element 114 may further interface with user-plane element 104 and mobility element 106. Mobility element 106 may further interface with control-plane element 102. User-plane element 104 may further interface with one or more PDN(s) 120. User-plane element 104 may further interface with control-plane element 102 via any combination of a 3GPP Sx interface and/or N4 interface (referred to herein as an 'Sx/N4' interface), depending on application and/or implement. For example, as defined in 3GPP standards for 4G CUPS architectures, the interface interconnecting an SGW-C and an SGW-U is an Sxa interface, the interface interconnecting a PGW-C and a PGW-U is an Sxb interface, the interface interconnecting a TDF-C and a TDF-U is an Sxc interface, and the interface interconnecting an SAEGW-C and an SAEGW-U is a combined Sxa/Sxb interface; whereas, for 5G architectures, the interface interconnecting an SMF and a UPF is an N4 interface. Any interfaces, sometimes referred to as reference points, between user-plane elements and control-plane elements can be envisioned depending on implementation.

In various embodiments, control-plane element 102 may be any combination and/or number of control-plane elements/nodes/devices/functions/etc. that may be provided (e.g., hosted/instantiated via one or more compute nodes) for a 3GPP CUPS (e.g., 4G/5G/NG) architecture that may provision, control, monitor, manage, etc. a user-plane element and/or UE sessions such as, but not limited to, a PGW-C, a TDF-C, a SAEGW-C, a SMF, and/or the like as may be defined by 3GPP standards. In various embodiments, user-plane element 104 may be any combination and/or number of user-plane elements/nodes/devices/functions/etc. that may be provided (e.g., hosted/instantiated vie one or more compute nodes) for a 3GPP CUPS (e.g., 4G/5G/NG) architecture that provides an interface to one or more PDN(s), such as, but not limited to, any number of a PGW-U, TDF-U, a SAEGW-U, a UPF, and/or the like as may be defined by 3GPP standards. In various embodiments, mobility element 106 may be any combination and/or number of an MME and/or an AMF that may be provided for a 3GPP CUPS (e.g., 4G/5G/NG) architecture that may perform functions of MMEs/AMFs as may be defined by 3GPP standards.

Policy/charging element 108 may be any combination and/or number of a Policy and Charging Rules Function (PCRF), as defined by 3GPP standards for 4G CUPS architectures, and a Policy Control Function (PCF), as defined by 3GPP standards for 5G architectures. Control-plane element 102 may further interface with policy/charging element 108 via any combination of a 3GPP Gx interface and/or N7 interface (referred to herein as a 'Gx/N7' interface). For example, as defined by 3GPP standards for 4G CUPS architectures, the interface interconnecting a PGW-U and a PCRF is the Gx interface; whereas for 5G architectures, the interface interconnecting an SMF and a PCF is the N7 interface. Policy/charging element 108 may be provided (e.g., hosted/instantiated via one or more compute nodes) to facilitate any combination of PCRF/PCF functionality to support operations as described herein.

In at least one embodiment, control-plane element 102, user-plane element 104, mobility element 106, and policy/charging element 108 may be implemented/hosted via one or more compute node(s) having hardware and software resources, which can be abstracted into one or more instances (instantiations) of control-plane element 102, user-plane element 104, mobility element 106, and/or policy/charging element 108. In various embodiments, a compute node can include, but not be limited to: a data center compute node such as a server, rack of servers, multiple racks of servers, etc. for a data center; a cloud compute node, which can be distributed across one or more data centers; combinations thereof or the like.

In various embodiments, UE 112 may be associated with any user, subscriber, employee, client, customer, electronic device, etc. wishing to initiate a flow in communication system 100 via some network. The terms 'UE device', 'UE', 'subscriber', and 'user' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an iPhone™ iPad™, a Google Droid™ phone, an IP phone, wearable electronic device or any other device, component, element, or object capable of initiating voice, audio, video, media, or data exchanges within communication system 100. UE 112 discussed herein may also be inclusive of a suitable interface to a human user such as a microphone, a display, a keyboard, or other terminal equipment. UE 112 may also be any device that seeks to initiate a communication on behalf of another entity or element such as a program, a database, or any other component, device, element, or object capable of initiating an exchange within communication system 100. In some embodiments, UE 112 may have a bundled subscription for network access and application services, etc. In various embodiments, RAN element 114 may be an eNodeB (e.g., for 4G), a gNodeB (e.g., for 5G), or any combination thereof.

During operation as part of DPI, user-plane element 104 can extract information from L7 traffic (e.g., data packets of a packet flow, illustrated as dashed-line 113) for UE 112 that can be used to classify and identify corresponding charging and/or policy actions that are to be performed on the particular packet flow 113 for UE 112.

In various embodiments, the extracted information can include, but not be limited to, any combination of the (non-exhaustive list of) parameters including: domain or host name; Hyper Text Transfer Protocol (HTTP) Uniform Resource Locator (URL); HTTP headers, transaction type (GET, POST, CONNECT, etc.); Sever Name Indication (SNI) exchanged as part of Transport Layer Security (TLS) handshake; Canonical Name (CNAME), Query type, IP address returned in Domain Name System (DNS) queries; Operating System (OS) Fingerprinting, Time To Live (TTL), etc.; device related information; patterns identified as part of heuristic analysis; and/or Content filtering/Parental control classification.

In some embodiments, this information may be extracted from a single flow (e.g., packet flow 113) or, in some embodiments, correlated across flows and can be several hundreds of bytes in size. User-plane element 104 uses this information to match against any of the L7 rules installed/ provisioned on it to classify the subscriber's traffic and identify the charging and/or policy actions that need to be taken.

Communication system 100 provides for a new framework in which the Sx/N4 interface is used to transfer flow classification related information between the user-plane and the control-plane and includes exchanging various attributes per flow, including: IP Flow identification information (e.g., 5-tuple such as Source IP address, Source Port, Destination IP address, Destination Port, and Protocol); a last matched rule identity, which may be a Rule Name or Rule Identifier (ID) and, if applicable, an application identifier and application instance identifier.

User-plane element 104 passes this information, referred to herein interchangeably as 'flow restoration information' or 'restoration information', to control-plane element 102 as part of a Packet Forwarding Control Protocol (PFCP) Session Report procedure whenever a flow (e.g., IP flow 113) is classified and/or re-classified by user-plane element 104. Control-plane element 102 stores the flow restoration information and, in at least one embodiment, communicates it back to user-plane element 104 as part of the restoration procedures using the PFCP Session Establishment procedure following a failover of user-plane element 104. In some embodiments, control-plane element 104 may communicate the flow restoration information to another user-plane element instance rather than the failed user-plane element.

As referred to herein, the terms 'failure' and 'failover' may be used interchangeably and may refer to any combination of: a failure of a process operating on a user-plane element, a failure of an entire user-plane element or instance of a user-plane element, or the like that causes extracted metadata information to be flushed for one or more flows handled by the user-plane element/process.

Referring to FIGS. 2A-2F, FIGS. 2A-2F are simplified diagrams illustrating example details associated with various information elements that may be used to communicate flow restoration information to provide for the preservation of policy and charging for a subscriber following a user-plane element (e.g., user-plane element 104) failover, according to an example embodiment.

FIG. 2A illustrates example details associated with a Restore Flow information element (IE) 200, which is illustrated in FIG. 2B, according to an example embodiment. Restore Flow IE 200 is a new IE that may be included in PFCP Session Report Request and Session Establishment Request messaging between a user-plane element (e.g., user-plane element 104) and a control-plane element (e.g., control-plane element 102) if the user-plane (e.g., a user-plane element) supports flow recovery and a new flow classification. Other conditions, as discussed herein below (e.g., based on flow type, flow activity time, number of flows, etc.) may be used to determine whether or not to include the Restore Flow IE in PFCP messaging.

Restore Flow IE 200 is a grouped IE, meaning that it can contain other IEs, as discussed in further detail with regard to FIGS. 2C-2F. As illustrated in FIG. 2B for Restore Flow IE 200, the IE Type is 'Restore Flow', the presence requirement (P) for the Restore Flow IE is optional (O), and the applicable interfaces for the IE are the Sxb, Sxc, and N4 interfaces.

In at least one embodiment, Restore Flow IE 200 includes a Restore Flow IE Type field 202 and a length field 204 in which Restore Flow IE Type field 202 includes a decimal value that can be used to identify the Restore Flow IE. Any 2-octet (16-bit) decimal value may be set for Type field 202 to identify the Restore Flow IE Type. Length field 204 includes a 2-octet length value for Restore Flow IE 200. The length of Restore Flow IE 200 may vary depending on the number of additional IEs that may be included in the IE. For example, a Flow Information IE 210 and a Rule Matched IE 220 are mandatory IEs that are to be present within Restore Flow IE 200, while an Application Identified IE 230 and an Application Instance Identifier IE 240 are optional IEs that may be present within Restore Flow IE 200. Information included in one or more of Flow Information IE 210 and Rule Matched IE 220, and, if applicable, Application Identified IE 230 and Application Instance Identifier IE 240 may be referred to herein using the terms 'flow restoration information' or 'restoration information', as discussed above.

Flow Information IE 210 may be of a type 'Flow Information' and may be encoded to carry flow identifying information that can be used to identify a particular flow among all the flows handled by a user-plane element for application of restoration information (e.g., last matched rule, etc.) for the particular flow following a failover. FIG. 2C illustrates example details associated with Flow Information IE 220. In at least one embodiment, Flow Information IE 210 may include a Type field 212, a Length field 214, and a Flow Information field 216. Type field 212 includes a 2-octet decimal value that identifies the Flow Information IE type. Length field 224 includes a 1-octet value identifying an 'n' length of the IE. In at least one embodiment, Flow Information field 216 is encoded in octets 4 to in to include identifying information can include 5-tuple information such as Source IP address, Source Port, Destination IP address, Destination Port, and Protocol. In some embodiments, other identifying information may be used to identify IP flows such as, for example, tunnel endpoint identifiers, attachment circuit identifiers (e.g., virtual local area network (VLAN) identifier, etc.), combinations thereof, or the like.

In still some embodiments, identifying information for a flow carried in Flow Information field 216 may include a Restore Flow Identifier (ID), which may be any unique value selected by a user-plane element to identify a flow. In at least one embodiment, the Restore Flow ID can be selected for a classified flow and the Restore Flow ID can be included in a PFCP Session Request message sent to a control plane element. In some embodiments, the Restore Flow ID can be used to identify a flow in lieu of and/or in addition to other flow identifying information, which may be useful for overwriting or deleting matched rule information for a flow in the event that classification of the flow changes and/or is updated (e.g., if the flow terminated or deleted in the user-plane). Restore Flow IE 210 may be formatted in a similar manner as any of IEs 220-240, discussed below.

Rule Matched IE 220 is of a type 'Rule Matched' and is used to identify a last policy and charging rule matched for a flow (e.g., as identified via the Flow Information IE) contained in the Restore Flow IE) for a particular subscriber prior to a user-plane element failover. FIG. 2D illustrates example details associated with Rule Matched IE 220. In at least one embodiment, Rule Matched IE 220 may include a Type field 222, a Length field 224, and a Rule Name field 226. Type field 222 includes a 2-octet decimal value that identifies the Rule Matched IE. Length field 224 includes a 1-octet value identifying an 'n' length of the IE. Rule Name field 226 is encoded in octets 4 to 'n' to include a rule name or rule identifier (ID) that identifies a last matched rule for the flow. In various embodiments, a rule name or rule ID may be any character string, bit string, value, or combinations thereof as defined by 3GPP standards that may be used to identify policy and charging rules.

Any 3GPP policy and/or charging rule types may be supported within communication system 100 including, dynamic rules, pre-defined rules, and static rules, as defined by 3GPP standards. In general, dynamic rules are rules that can be installed and activated via the Sx/N4 interface when a subscriber's session is setup or anytime during the life of the subscriber's session (e.g., via session establishment and/or session modification messages). In general, pre-defined rules are rules that can be provisioned during or after initialization of a user-plane element via the Sx/N4 interface and/or directly on the user-plane element (e.g., via Command Line Inputs (CLIs)), but activation of such rules is controlled by a policy/charging element. In general, static rules are rules that can be provisioned during or after initialization of a user-plane element via the Sx/N4 interface and/or directly on the user-plane element (e.g., via CLIs) and are active from the time a subscriber's session, if applicable, is setup. In at least one embodiment, pre-defined and static rules can be provisioned for a control-plane element (e.g., control-plane element 102) during or after initialization (e.g., by a network orchestration function, or the like) and dynamic rules can be provided to the control-plane element by a policy/charging element (e.g., policy/charging element 108) as needed for subscriber sessions.

In some embodiments, Restore Flow IE 200 may further include Application Identified IE 230. Application Identified IE 230 is of a type 'Application Identified' and may optionally (O) be present in Restore Flow IE 200 to identify a last application identified for a flow (e.g., as identified via the Flow Information IE contained in the Restore Flow IE) of a particular subscriber prior to a user-plane element failover.

Figure 2E:
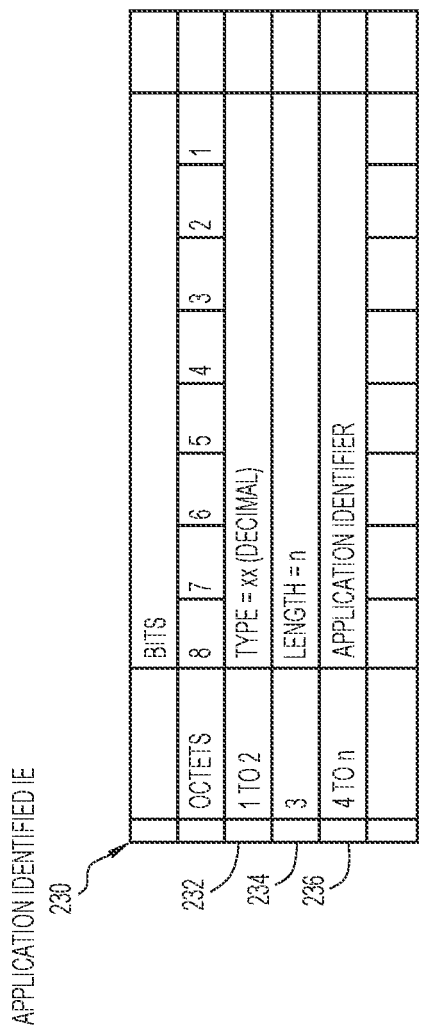

FIG. 2E illustrates example details associated with Application Identified IE 230. In at least one embodiment, Application Identified IE 230 may include a Type field 232, a Length field 234, and an Application Identifier field 236. Type field 232 includes a 2-octet decimal value that identifies the Application Identified IE. Length field 234 includes a 1-octet value identifying an 'n' length of the IE. Application Identifier field 236 is encoded in octets 4 to 'n' to include an application identifier that indicates a last application identified for the flow. As noted previously, applications can include any variety of services, functions, etc. such as, for example, streaming audio/video applications, peer-to-peer applications, voice over IP applications, etc. In various embodiments, an application identifier may be any character string, bit string, value, or combinations thereof as defined by 3GPP standards that may be used to identify an application.

In some embodiments, Restore Flow IE 200 may further include Application Instance Identifier IE 240. In general, an application instance identifier is dynamically assigned by a user-plane element in order to allow correlation of application start and application stop event triggers for a flow for certain reporting that may be provided to the control-plane element for the application via the Sx/N4 interface. Application Instance Identifier IE 240 is of a type 'Application Instance Identifier' and may have a conditional-optional (C) presence indicator, in that Application Instance Identifier IE 240 will be present in Restore Flow IE 200 to indicate an application instance identifier for a last identified application if Application Identified IE 230 is included in Restore Flow IE 200.

Figure 2F:
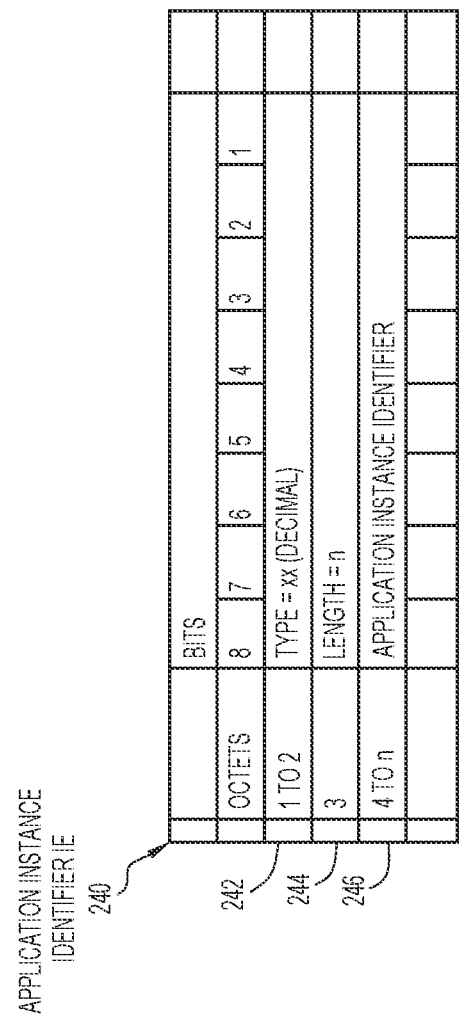

FIG. 2F illustrates example details associated with Application Instance Identifier IE 240. In at least one embodiment, Application Instance Identifier IE 240 may include a Type field 242, a Length field 244, and an Application Instance Identifier field 246. Type field 242 includes a 2-octet decimal value that identifies the Application Instance Identifier IE. Length field 244 includes a 1-octet value identifying an 'n' length of the IE. Application Instance Identifier field 246 is encoded in octets 4 to 'n' to include an application identifier that indicates an application instance identifier for a last application identified for the flow, as encoded within Application Identifier IE 230. In various embodiments, an application instance identifier may be any character string, bit string, value, or combinations thereof that may be used by a user-plane element to indicate an application instance.

Referring again to FIG. 1, in accordance with embodiments described herein, Restore Flow IE 200 may be included in PFCP Session Report messaging (prior to a failover of user-plane element 104) to transfer flow restoration information from user-plane element 104 to control-plane element 102 based on classification and/or re-classification of a subscriber's flow to a policy and/or charging rule.

Upon receiving Restore Flow IE 200 within PFCP Session Report messaging, control-plane element 102 is expected to store information contained in the IE (e.g., flow information and rule name or rule ID and, in some cases, application identifier and application instance identifier) as opaque data (e.g., data that may not be otherwise utilized by control-plane element 102) for a flow. In the event that the traffic classification of a flow changes or that a flow has been terminated or deleted in the user-plane, user-plane element 104 can inform control-plane element 102 of the classification change or flow termination or deletion using the same mechanism. Upon receiving updated information for a flow, control-plane element 102 can identify the flow based on information identified by Flow Information IE (e.g., Restore Flow ID, etc.) and can overwrite or append the previously stored information for the flow identified by the Flow Information IE. In the event that the flow is terminated or deleted in the user-plane, existing flow restoration information in control-plane element 102 can be removed. In various examples, a flow may be terminated or deleted in the user-plane upon reception of a TCP FIN or TCP RST in the case of TCP traffic or due to a flow idle timeout (e.g., if no packets are received on the flow for a configured period of time).

Thus, in some embodiments, control-plane element 102 can determine whether a PFCP Session Report request message is for a new flow classification, to update existing flow restoration information previously stored on the control-plane element 102 for a flow, or to remove existing flow restoration information stored on the control-plane element 102 for a flow based on whether a Restore Flow ID contained in a PFCP Session Report request message for a flow matches a Restore Flow ID for existing flow restoration information stored on the control-plane element 102 for the flow. For example, if the Restore Flow ID received in a PFCP Session Report request message for a flow does match a Restore Flow ID corresponding to existing flow restoration information stored on control-plane element 102 for the flow and flow restoration information in the request from the user-plane element 104 is different from the existing stored flow restoration information for the flow, then control-plane element 102 can determine that the request is to update the flow restoration information for the flow corresponding to the Restore Flow ID. In various embodiments, existing flow restoration information stored on the control-plane element 102 can be updated by overwriting portions of the existing flow restoration information with any new flow restoration information that has changed and/or adding new flow restoration information to existing flow restoration information stored by the control-plane element 102 for the flow. In another example, if a Restore Flow ID contained in the PFCP Session Report request message for a flow does not match a Restore Flow ID for any existing flow restoration information stored on control-plane element 102, then control-plane element 102 can determine that the request is to store new flow restoration information for the flow identified in the request.

In some embodiments, flow restoration information sent from the user-plane element for a flow identified via the Flow Information IE may include no rule name for the Rule Matched IE (e.g., Rule Name field 226 may be set to binary '0000 0000'), which may indicate to the control-plane element 102 that the flow has been terminated or deleted in the user-plane. For example, if the Restore Flow ID received in a PFCP Session Report request message for a flow does match a Restore Flow ID corresponding to existing flow restoration information stored on control-plane element 102 and there is no rule name identified in the Rule Matched IE of the received flow restoration information, then the control-plane element 102 can determine that the flow has been terminated or deleted in the user-plane and can remove flow restoration information for the flow from its memory/storage.

In still some embodiments, a new Remove Flow IE may be defined as a new grouped IE, which may include a type field set to a value to identify the Remove Flow IE type (e.g., any decimal value to uniquely identify the type) and a length field set accordingly. The Remove Flow IE may include Flow Information IE 210. During operation in such embodiments, based on a determination that a user-plane flow has been terminated or deleted by user-plane element 104, the user-plane element may send a PFCP Session Report request to control-plane element including the new Remove Flow IE in which flow information such as 5-tuple and/or Restore Flow ID for the flow that has been terminated or deleted may be encoded in the Flow Information IE. Based on receiving a PFCP Session Report request message including the new Remove Flow IE, the control-plane element 102 may determine, based on the type of the IE (Remove Flow) and the flow information contained in the Flow Information IE, to remove flow restoration information for the flow from its memory/storage. Thus, different techniques may be provided to remove flow restoration information for one or more flows that may be stored by control-plane element 102.

Similar determinations could be made by control-plane element 102 in the absence of a Restore Flow ID using other flow identifying information, in some embodiments. However, certain processing efficiencies may be realized by determining whether a match exists based on one piece of information, such as a Restore Flow ID, for a flow as opposed to determining whether a match exists based on multiple other pieces of information (e.g., 5-tuple, etc.).

In at least one embodiment, when a failure is detected for user-plane element 104, control-plane element 102 is expected to include this opaque data (e.g., flow restoration information) within Restore Flow IE 200 as part of the PFCP Session Establishment procedure during the restoration process of user-plane element 104. In another embodiment, control-plane element 102 may select another user-plane element instance to handle the flows, in which the data can be sent to the other user-plane element.

After restoration, when user-plane element 104 receives at least one data packet for a flow which was existing before the failure, the information contained in Restore Flow IE 200 is used to identify and apply the same policing and/or charging policies based, at least in part, on the last rule matched. This ensures no billing discrepancy and/or degradation of quality of experience for the subscriber. Thus, communication system 100 provides for the preservation of policy and/or charging characteristics (e.g., rules) for the user-plane (e.g., for any element in the user-plane) following a user-plane failover for one or more subscriber flows that the user-plane handled prior to the failover.

Referring to FIG. 3, FIG. 3 is a simplified sequence diagram illustrating example interactions and operations 300 associated with flow classification and PFCP Session reporting, according to an example embodiment. FIG. 3 includes user-plane element 104 and control-plane element 102. For the embodiment of FIG. 3, consider that user-plane element 104 has been initialized and has received and stored rule information for various policy and charging rules from control-plane element via the Sx/N4 interface.

At 302, a flow is setup for a subscriber (e.g., UE 112) at user-plane element 104, and user-plane element 104 begins to route traffic for the flow between UE 112 and PDN 120 (e.g., the Internet). In at least one embodiment, flow setup may include receiving a first data packet for a flow (e.g., first sign of life). For example, in the case of Transmission Control Protocol (TCP), the first data packet will be the TCP SYN and in the case of User Datagram Protocol, it will be the first data packet with the 5-tuple. At 304, user-plane element 104 extracts flow identification information (e.g., 5-tuple) and metadata information from the flow and classifies the flow against the installed rules (e.g., rule information) stored on user-plane element 104 to identify a rule to apply to the flow. Although not shown, in FIG. 3, it is to be understood that user-plane element 104 applies policies and/or charging to the flow based on the classification. In some embodiments, user-plane element 104 may also identify an application associated with the flow and assign an application instance identifier for the flow based on the application identification. In at least one embodiment, user-plane element 104 may also generate a Restore Flow ID (to be included in the Flow Information IE 210) for the flow at 304.

Based on the classification, user-plane element 104 generates and sends, at 306, a PFCP Session Report Request message to control-plane element 102 via the Sx/N4 interface that includes, at least in part, flow restoration information associated with the classified flow via Restore Flow IE 200 containing, at least in part, flow identifying information contained in Flow Information IE 210, the rule name or rule ID associate with the classified rule contained in Rule Matched IE 220 and, if applicable, an application identifier associated with the flow contained in Application Identified IE 230 and an application instance identifier associated with the identified application contained in Application Instance Identifier IE 240. In some embodiments, multiple Restore Flow IEs 200 can be included in PFCP Session for multiple flows classified at user-plane element 104.

At 308, control-plane element 102 stores the flow restoration information contained in the Restore Flow IE 200 as opaque data and, at 310, control-plane element generates and sends a PFCP Report Response message to user-plane element 104 indicating, at least in part, successful storage of the information contained in Restore Flow IE 200. Control-plane element 102 is expected to include the flow restoration information as part of the PFCP Session Establishment procedure during the restoration process of user-plane element 104 following a failover of user-plane element 104. In some embodiments, at 308, control-plane element 102 may determine whether to store the flow restoration information (e.g., classification for a new flow has occurred), overwrite or update previously stored flow restoration information (e.g., a classification for an existing flow has changed), or remove flow restoration information (e.g., for terminated or deleted flows) using matching techniques, as discussed herein.

In some embodiments, the operations and interactions illustrated in the embodiment of FIG. 3 can be repeated for multiple flows setup and classified and/or re-classified by user-plane element 104. However, since the number of session reports exchanged between the control-plane and user-plane to report the Restore Flow information will be dependent on the flow setup rates and can be quite huge, it can potentially clog the Sx/N4 interface. In order to avoid this, user-plane element 104 may, in some embodiments, be configured to send restoration reports only for flows that have been active for more than a configured threshold time. In at least one embodiment, control-plane element 102 may configure the threshold time for user-plane element 104. In some embodiments, different threshold times and/or ranges of threshold times may be configured for user-plane element 104 in which different threshold times and/or ranges of threshold times may be used for any combination of different flow types, different subscription types, different rules, different users, different user locations, combinations thereof, and/or any other variations.

In still some embodiments, user-plane element 104 may be configured to select the type of flows that are to be restored based on the traffic classification in order to avoid overloading the Sx/N4 interface. In still some embodiments, a maximum number of flows that may be restored on an instance of user-plane element 104 may be configured to avoid overloading the Sx/N4 interface. Other variations for limiting the number of flows restored on user-plane element 104 can be envisioned.

Referring to FIG. 4, FIG. 4 is a simplified sequence diagram illustrating example interactions and operations 400 associated with a restoration process for user-plane element 104 following a failover, according to an example embodiment. FIG. 4 includes user-plane element 104 and control-plane element 102. Following a failover of user-plane element 104, user-plane element 104 restarts and generates a PFCP Association Setup Request message, which user-plane element 104 sends to control-plane element 102 at 402 via the Sx/N4 interface.

At 404, control-plane element 102 generates and sends a PFCP Association Setup Response message to user-plane element 104 indicating acceptance of the association. Upon establishing the association between user-plane element 104 and control-plane element 102, control-plane element 102 may begin to provide flow restoration information to user-plane element. For example, at 406, control-plane element 102 generates and sends a PFCP Session Establishment Request message to user-plane element 104 that includes, at least in part, various policy and charging rules that are to be installed on user-plane element 104 as well as Restore Flow IE 200, which includes the flow restoration information that it had previously received at 306 (FIG. 3). In some embodiments, multiple Restore Flow IEs 200 may be included in a Session Establishment request for multiple flows that a user-plane element may receive.

At 408, user-plane element stores the flow restoration information and, at 410, generates and sends a PFCP Session Establishment Response message to control-plane element 102 indicating acceptance of the session establishment request.

While FIG. 4 illustrates details associated sending flow restoration information to user-plane element 104 following a failover of the user-plane element, in some embodiments, control-plane element may select another user-plane element (e.g., another instance) to restore the sessions of the failed user-plane instance. In such embodiments, control-plane element 102 may select the other user-plane element and initiate providing the flow restoration information to the selected user-plane element using the messaging as shown at 406.

Referring to FIG. 5, FIG. 5 is a simplified sequence diagram illustrating example interactions and operations 500 associated with receiving a data packets for one or more flows at user-plane element 104 following a failover, according to an example embodiment. FIG. 5 includes user-plane element 104 and PDN 120/UE 112.

For the embodiment of FIG. 5, consider that user-plane element 104 has experienced a failover and completed the PFCP Session Establishment process (e.g., as shown in FIG. 4) in which user-plane element 104 has received policy and charging rules from control-plane element 102 and has also received flow restoration information from control-plane element 102 for flows that existed before the failure (e.g., as setup at 302, shown in FIG. 3).

Consider further for the embodiment of FIG. 5 that user-plane element 104 receives, at 502, data packets of flows that existed before the failure. In some cases, the data packets may be received from UE 112; however, in other cases, the data packets may be received from PDN 120.

At 504, user-plane element 104 determines flow information (e.g., 5-tuple) for at least one data packet of at least one flow and checks to determine whether flow restoration information is found (stored) for the flow. At 506, based on a determination that restoration information is found for the flow, user-plane element applies policies and/or charging for the flow based on the last matched rule stored for the flow and sends (510) processed packets for the flow to PDN 120 or UE 112 (based on whether the data packets were received from UE 112 to be sent to PDN 120 or were received from PDN 120 to be sent to UE 112).

However, at 508, based on a determination that flow restoration information is not found for the flow, user-plane element 104 extracts flow information and metadata information from the flow and classifies the flow, at 508. Following the classification at 508, user-plane element 104 can perform the PFCP Session Reporting, as discussed above at 306 for FIG. 3. At 510, user-plane element 104 sends the processed packets to PDN 120 or UE 112 (based on whether the data packets were received from UE 112 to be sent to PDN 120 or were received from PDN 120 to be sent to UE 112).

Figure 6:
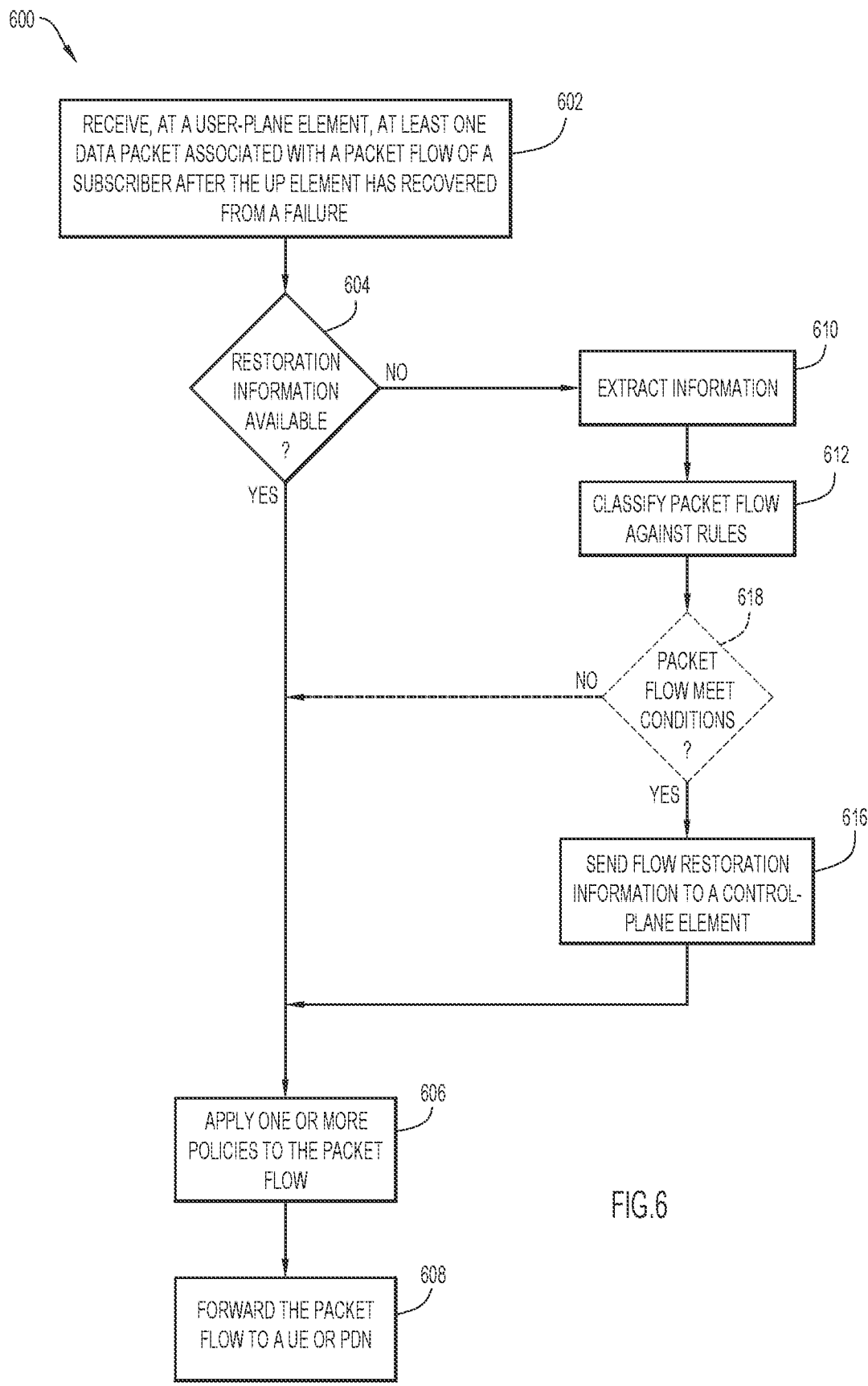
FIG. 6 is a simplified flow chart illustrating example operations associated with the preservation of policy and charging for a subscriber following a user-plane element failover, according to an example embodiment.

Referring to FIG. 6, FIG. 6 is a simplified flow chart illustrating example operations 600 associated with the preservation of policy and charging for a subscriber following a user-plane failover, according to an example embodiment. In at least one embodiment, operations 600 are performed by a user-plane element (e.g., user-plane element 104).

At 602, the operations include the user-plane element receiving at least one data packet associated with a packet flow of a subscriber, and the at least one data packet is received by the user-plane element after the user-plane element has recovered from a failure. At 604, the operations include the user-plane element determining whether restoration information (e.g., last matched rule, etc.) associated with the packet flow is available at the user-plane element. In at least one embodiment, the operations at 604 can be performed by extracting 5-tuple flow information from the packet flow and comparing the flow information for the packet flow to flow information contained in restoration information stored on the user-plane element to determine whether there is a match for the flow information for the subscriber's packet flow.

At 606, based on a determination that restoration information is available for the subscriber's packet flow, the operations include the user-plane element applying one or more policies, based on the last matched rule contained in the restoration information to the packet flow and forwarding (608) the packet flow to a UE or PDN (e.g., based on where the packet flow originated and is to be terminated).

Returning to 604, based on a determination that no restoration information is available for the packet flow, the operations can include extracting information (e.g., 5-tuple information and upper layer metadata information) from the packet flow at 610. At 612, the operations can include the user-plane element classifying the packet flow against policy and charging rules installed on the user-plane element. Following the classification, at 616, the operations can include the user-plane element sending flow restoration information to a control-plane element (e.g., control-plane element 102). For example, the user-plane element can generate and send a PFCP Session Report Request including the Restore Flow IE 200 that can be encoded, at least in part, with extracted 5-tuple flow information for the packet flow and the rule name or rule ID for the classified rule for the packet flow. Other information, such as application identifier and application instance identifier may also be included in the Restore Flow IE 200, if applicable. In at least one embodiment, the operations at 616 may include generating a Restore Flow ID for the classified flow in which the Restore Flow ID is included in the Restore Flow IE.

Following the operations at 616, the operations at 606 and 608 can be performed in which the user-plane element applies one or more policies to the packet flow and forwards the packet flow to the UE or PDN.

In some embodiments, the operations may include determining, at 618, whether one or more session reporting conditions are met before performing the operations at 616. For example, in some embodiments, the user-plane element may determine whether the packet flow meets one or more session reporting conditions, such as whether the packet flow has been active for more than a threshold time, whether the packet flow corresponds to a type for which restoration information is to be reported, among others, as discussed herein. Based on a determination at 618 that restoration information for the packet flow is to be reported to the control-plane element, the operations can proceed to 616 and continue as discussed above. However, based on a determination at 618 that restoration information for the packet flow is not to be reported to the control-plane element, the operations can proceed to 606 and continue as discussed above.

Accordingly, techniques as described herein may be implemented by communication system 100 to provide for the preservation of policy and charging characteristics for a subscriber's flow following a user-plane failover.

Figure 7:
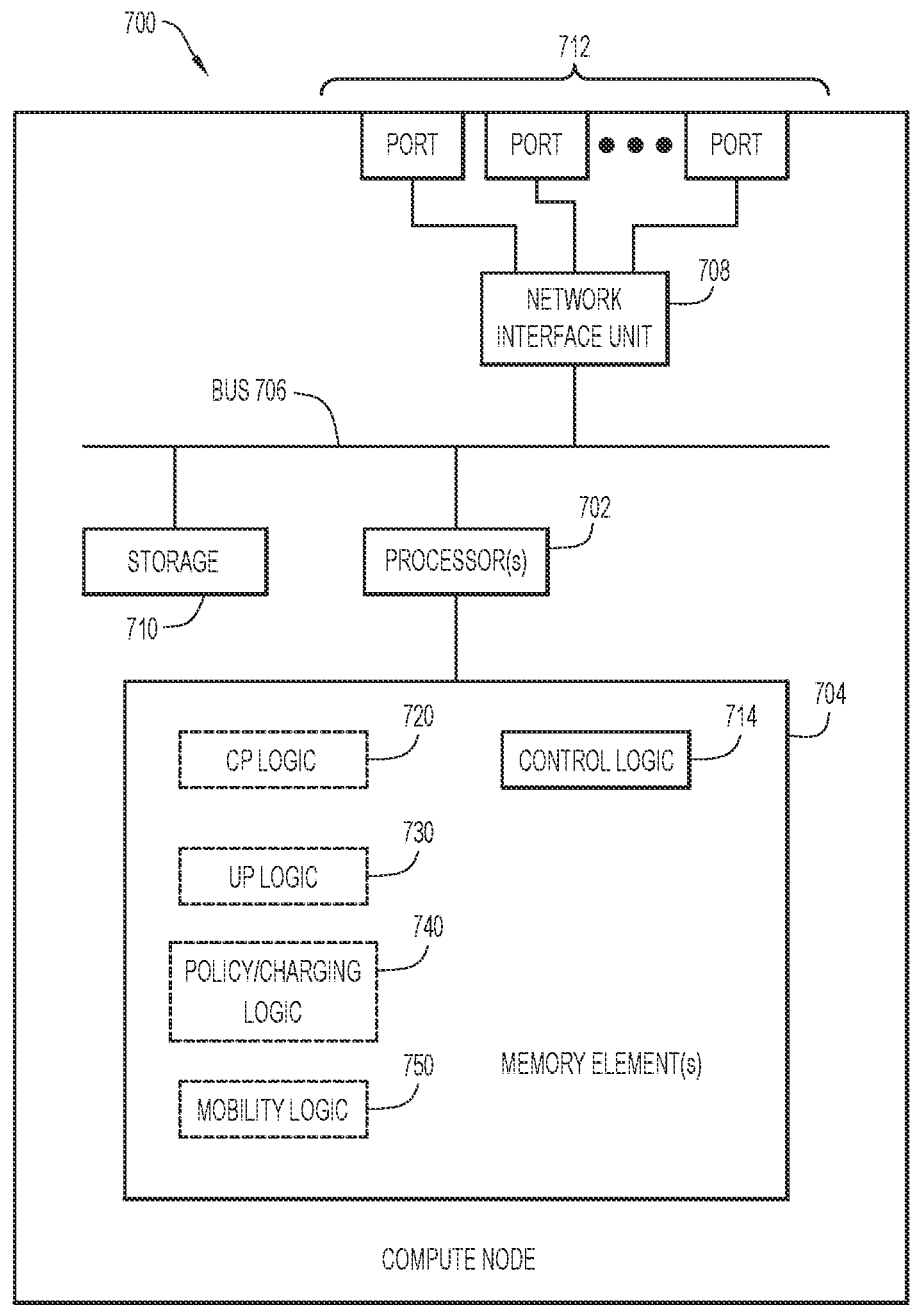
FIG. 7 is a simplified block diagram illustrating example details associated with a compute node for implementing operations described herein, according to an example embodiment.

Referring to FIG. 7, FIG. 7 is a simplified block diagram illustrating example details associated with a compute node 700 for implementing operations described herein, according to an example embodiment. The embodiment of FIG. 7 illustrates compute node 700, which includes one or more processor(s) 702, one or more memory element(s) 704, a bus 706, a network interface unit 708, and storage 710. Memory element(s) 704 may include instructions for control logic 714. In various embodiments, memory element(s) 704 may also include instructions for control-plane (CP) logic 720, user-plane (UP) logic 730, policy/charging logic 740, or mobility logic 750. In various embodiments, compute node 700 can be implemented: as a data center compute node such as a server, rack of servers, multiple racks of servers, etc. for a data center; as a cloud compute node, which can be distributed across one or more data centers; as combinations thereof or the like.

In various embodiments, one or more compute node(s) 700 can be used to realize communication system 100. In various embodiments, processor(s) 702, memory element(s) 704, bus 706, network interface unit 708, storage 710 and logic, software, etc. configured for compute node 700 can represent hardware, software, and network resources, which can be abstracted into a 4G CUPS architecture and/or 5G architecture for communication system 100 comprising any number or instances of control-plane elements 102, user-plane elements 104 and/or policy/charging elements 108 for various architectures.

In at least one embodiment, processor(s) 702 is/are at least one hardware processor configured to execute various tasks, operations, and/or functions for compute node 700 as described herein according to software and/or instructions configured for compute node 700. In at least one embodiment, memory element(s) 704 is/are configured to store data, information, software and/or instructions associated with compute node 700 and logic configured for memory element(s) 704. In at least one embodiment, bus 706 can be configured as an interface that enables one or more elements of compute node 700 (e.g., network interface unit 708, processor(s) 702, memory element(s) 704 (and logic configured therein), etc. to communicate in order to exchange information and/or data. In at least one embodiment, a fast kernel-hosted interconnect may be employed for compute node 700, potentially using shared memory between processes (e.g., VNFs, etc.), which can enable efficient communication paths between the processes. In various embodiments, network interface unit 708 enables communication between compute node 700 and other compute nodes, via one or more ports 712 at which traffic is received and transmitted to facilitate operations discussed for various embodiments described herein. In some embodiments, network interface unit 708 can be configured with one or more Ethernet driver(s) and/or controller(s) or other similar network interface driver(s) and/or controller(s) to enable communications for compute node 700 within communication system 100. Compute node 700 can include any suitable interfaces for receiving, transmitting, and/or otherwise communicating data or information in a network environment.

In various embodiments, storage 710 can be configured to store data, information and/or instructions associated with compute node 700 and/or logic configured for memory element(s) 704. For example, for embodiments in which an instance of a user-plane element (e.g. user-plane element 104) is implemented, storage 710 can be configured to store policy and charging rules, classification information for rules, restoration information received from a control-plane element, extracted flow information and metadata, session reporting conditions, or the like. In another example, for embodiments in which an instance of a control-plane element (e.g., control-plane element 102) is implemented, storage 710 can be configured to store policy and charging rules, classification information for rules, flow restoration information and/or other opaque received from a user-plane element via session reporting, or the like. Note that in certain examples, storage 710 can be consolidated with memory elements 704 (or vice versa), and/or the storage/memory elements can overlap/exist in any other suitable manner.

In at least one embodiment, control logic 714 may include instructions that, when executed (e.g., by processor(s) 702), cause compute node 700 to perform operations for a control-plane element including, but not limited to, providing control/management/etc. operations for compute node 700, cooperating and/or interacting with other logic; maintaining and/or interacting with stored data, information, parameters (e.g., memory element(s), storage, data structures, databases, tables, etc.); combinations thereof; and/or the like to facilitate various operations as discussed for various embodiments described herein.

In at least one embodiment, CP logic 720 can include instructions that, when executed (e.g., by processor(s) 702) cause compute node 700 to perform operations for a control-plane element, which can include, but not be limited to, performing association processes, performing session establishment processes, performing session reporting processes with one or more user-plane elements, which may include, but not be limited to receiving, storing, updating, providing, etc. restoration information; cooperating and/or interacting with other logic; maintaining and/or interacting with stored data, information, parameters (e.g., memory element(s), storage, data structures, databases, tables, etc.); combinations thereof; and/or the like to facilitate various operations as discussed for various embodiments described herein.

In at least one embodiment, UP logic 730 can include instructions that, when executed (e.g., by processor(s) 702) cause compute node 700 to perform operations for a user-plane element (e.g., user-plane element 104), which can include, but not be limited to, performing association processes, performing session establishment processes, performing session reporting processes with one or more control-plane elements, which may include, but not be limited to encoding, generating, sending, receiving, storing, etc. restoration information, as discussed for various operations described herein. UP logic 730 can also include instructions that, when executed, cause compute node 700 to perform operations for a user-plane element including, but not limited to, extracting information (e.g., flow information and metadata information) from flows; classifying flows; encoding, generating, etc. restoration information for flows based on classifications/re-classifications; determining whether restoration information is stored for flows; applying policies (e.g., last matched rules) to flows; forwarding traffic; cooperating and/or interacting with other logic; maintaining and/or interacting with stored data, information, parameters (e.g., memory element(s), storage, data structures, databases, tables, etc.); combinations thereof; and/or the like to facilitate various operations as discussed for various embodiments described herein.

In at least one embodiment, policy/charging logic 740 can include instructions that, when executed, cause compute node 700 to perform operations for a policy/charging element (e.g., policy/charging element 108), which can include, but not be limited to, providing policy and charging rules for one or more control-plane elements; cooperating and/or interacting with other logic; maintaining and/or interacting with stored data, information, parameters (e.g., memory element(s), storage, data structures, databases, tables, etc.); combinations thereof; and/or the like to facilitate various operations as discussed for various embodiments described herein.

In at least one embodiment, mobility logic 750 can include instructions that, when executed, cause compute node 700 to perform operations for a mobility element (e.g., policy/charging element 106), which can include, but not be limited to, performing mobility related operations as defined by 3GPP standards; cooperating and/or interacting with other logic; maintaining and/or interacting with stored data, information, parameters (e.g., memory element(s), storage, data structures, databases, tables, etc.); combinations thereof; and/or the like to facilitate various operations as discussed for various embodiments described herein.

In various embodiments, memory element(s) 704 may include any suitable memory element such as random access memory (RAM), dynamic RAM (DRAM), static RAM (SRAM), and cache memory. In general, memory element(s) 704 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 710 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 710 may also be removable. For example, a removable hard drive may be used for storage 710. Other examples include optical and magnetic disks, thumb drives, and smart cards that are inserted into a drive for transfer onto another computer readable storage medium that is also part of storage 710.

In one form, techniques presented herein provide a computer-implemented method of receiving, by a user-plane element, at least one data packet of a packet flow associated with a subscriber, wherein the at least one data packets is received after the user-plane element has recovered from a failure, determining, by the user-plane element, whether restoration information associated with the packet flow is stored at the user-plane element, and applying one or more policies to the packet flow based on a determination that the restoration information associated with the packet flow is stored at the user-plane element, wherein the restoration information comprises a rule associated with the packet flow. The method may further include determining a classification for the packet flow based on a determination that the restoration information associated with the packet flow is not stored at the user-plane element, wherein the classification is based on rule information stored on the user-plane element. The method may further include prior to receiving the at least one data packet, determining a classification for the packet flow at the user-plane element using a prior packet flow associated with the subscriber, wherein the classification is based on rule information stored on the user-plane element; and communicating the restoration information to a control-plane element. The restoration information may be included in a Packet Forwarding Control Protocol Session Report message communicated to the control-plane element.

In various instances, the restoration information may include flow information identifying one or more of: a source address, a source port, a destination address, a destination port, a protocol, and a flow identifier associated with the packet flow; and at least one of: a rule name and a rule identifier that indicates the rule associated with the packet flow; an application identifier that indicates an application associated with the packet flow; and an application instance identifier that associated with the application. In at least one instance, the communicating may be performed based on at least one of: determining that the prior packet flow is active for more than a threshold time, determining that the classification for the prior packet flow corresponds to a particular flow type for which the restoration information is to be communicated to the control-plane element, and determining that the prior packet flow is less than a maximum number of packet flows that can be restored on the user-plane element. In at least one instance, the method may further include after the user-plane element has recovered from the failure and prior to receiving the at least one data packet, receiving restoration information for one or more prior packet flows from a control-plane element.

In another form, one or more non-transitory computer readable storage media are provided. The one or more non-transitory computer readable storage media being encoded with instructions that, when executed by a processor, cause the processor to perform operations comprising: receiving, by a user-plane element, at least one data packet of a packet flow associated with a subscriber, wherein the at least one data packets is received after the user-plane element has recovered from a failure, determining, by the user-plane element, whether restoration information associated with the packet flow is stored at the user-plane element, and applying one or more policies to the packet flow based on a determination that the restoration information associated with the packet flow is stored at the user-plane element, wherein the restoration information comprises a rule associated with the packet flow.

In another form an apparatus is provided. The apparatus comprises at least one memory element for storing data and at least one processor for executing instructions associated with the data, wherein executing the instructions causes the apparatus to perform operations, comprising: receiving, by a user-plane element, at least one data packet of a packet flow associated with a subscriber, wherein the at least one data packets is received after the user-plane element has recovered from a failure, determining, by the user-plane element, whether restoration information associated with the packet flow is stored at the user-plane element, and applying one or more policies to the packet flow based on a determination that the restoration information associated with the packet flow is stored at the user-plane element, wherein the restoration information comprises a rule associated with the packet flow.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), in digital signal processing (DSP) instructions, software [potentially inclusive of object code and source code] to be executed by a processor, or other similar machine, etc.). In some of these instances, a memory element or storage [as shown in FIG. 7] can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor [as shown in FIG. 7] may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

In one example implementation, a compute node (e.g., compute node 700) can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for communication systems such as those illustrated in FIG. 1).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Simple Object Access Protocol (SOAP), SOAP over Hypertext Transfer Protocol (HTTP), Representational State Transfer (REST), combinations thereof, or the like. In some embodiments, secure communications can be facilitated using TCP/IP Secure Sockets Layer (SSL) communications.

In various embodiments, communication system 100 can represent a series of points or elements of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network(s) (e.g., one or more packet data network(s) 120). Communication system 100 may offer communicative interfaces between various elements of communication system 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment A communication system, such as communication system 100, through which communications propagate in can use any suitable technologies for communication including wireless (e.g., 3G/4G/5G/NG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

The embodiments presented may be implemented in various forms, such as a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding FIGS. illustrate only some of the possible scenarios that may be executed by, or within, a communication system (e.g., communication system 100). Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
   obtaining, by a user-plane element, restoration information for one or more packet flows from a control-plane element, wherein the restoration information for the one or more packet flows is obtained via a session establishment request message obtained from the control-plane element;
   receiving, by the user-plane element, at least one data packet of a particular packet flow associated with a subscriber, wherein the at least one data packet is received following a failure of the user-plane element or another user-plane element that previously handled the particular packet flow associated with the subscriber;
   determining, by the user-plane element, whether particular restoration information associated with the particular packet flow is stored at the user-plane element; and
   in response to determining that the particular restoration information associated with the packet flow is stored at the user-plane element, applying one or more policies to the particular packet flow, wherein the restoration information comprises a last matched rule for the particular packet flow that was determined prior to the failure of the user-plane element or the another user-plane element that previously handled the particular packet flow associated with the subscriber.

2. The method of claim 1, further comprising:
   in response to determining that the restoration information associated with the particular packet flow is not stored at the user-plane element, determining a classification for the particular packet flow, wherein the classification is based on rule information stored on the user-plane element.

3. The method of claim 1, further comprising:
   prior to receiving the at least one data packet, determining a classification for the particular packet flow by the user-plane element or the another user-plane element that previously handled the particular packet flow associated with the subscriber; and
   communicating the restoration information to the control-plane element.

4. The method of claim 3, wherein the restoration information is included in a Packet Forwarding Control Protocol Session Report message communicated to the control-plane element.

5. The method of claim 3, wherein the restoration information comprises:
   flow information identifying one or more of: a source address, a source port, a destination address, a destination port, a protocol, or a flow identifier associated with the particular packet flow; and
   at least one of: a rule name or a rule identifier that indicates the last matched rule associated with the particular packet flow; an application identifier that indicates an application associated with the particular packet flow; or an application instance identifier that is associated with the application.

6. The method of claim 3, wherein the communicating is performed based on at least one of:
   determining that the particular packet flow is active for more than a threshold time;

determining that the classification for the particular packet flow corresponds to a particular flow type for which the restoration information is to be communicated to the control-plane element; and determining that the particular packet flow is less than a maximum number of packet flows that can be restored on the user-plane element.

7. The method of claim 1, further comprising:

determining, by the user-plane element, a termination or deletion of the particular packet flow associated with the subscriber; and sending a communication to the control-plane element that indicates that restoration information associated with the particular packet flow is to be removed at the control-plane element.

8. The method of claim 1, further comprising:

determining, by the user-plane element, an updated classification for the particular packet flow associated with the subscriber; and sending a communication to the control-plane element to update the restoration information associated with the particular packet flow.

9. The method of claim 1, wherein the session establishment request message is a Packet Forwarding Control Protocol Session Establishment Request message.

10. The method of claim 1, wherein the restoration information is included within a restore flow grouped information element (IE) within the session establishment request message and the restore flow grouped IE comprises a flow information IE including information identifying the particular packet flow and a rule matched IE indicating the last matched rule.

11. One or more non-transitory computer readable storage media encoded with instructions that, when executed by a processor, cause the processor to perform operations, comprising:

obtaining, by a user-plane element, restoration information for one or more packet flows from a control-plane element, wherein the restoration information for the one or more packet flows is obtained via a session establishment request message obtained from the control-plane element;

receiving, by the user-plane element, at least one data packet of a particular packet flow associated with a subscriber, wherein the at least one data packet is received following a failure of the user-plane element or another user-plane element that previously handled the particular packet flow associated with the subscriber;

determining, by the user-plane element, whether particular restoration information associated with the particular packet flow is stored at the user-plane element; and in response to determining that the particular restoration information associated with the packet flow is stored at the user-plane element, applying one or more policies to the particular packet flow, wherein the restoration information comprises a last matched rule for the particular packet flow that was determined prior to the failure of the user-plane element or the another user-plane element that previously handled the particular packet flow associated with the subscriber.

12. The media of claim 11, wherein the execution causes the processor to perform further operations, comprising:

in response to determining that the restoration information associated with the particular packet flow is not stored at the user-plane element, determining a classification for the particular packet flow, wherein the classification is based on rule information stored on the user-plane element.

13. The media of claim 11, wherein the execution causes the processor to perform further operations, comprising:

prior to receiving the at least one data packet, determining a classification for the particular packet flow by the user-plane element or the another user-plane element that previously handled the particular packet flow associated with the subscriber; and communicating the restoration information to the control-plane element.

14. The media of claim 13, wherein the restoration information is included in a Packet Forwarding Control Protocol Session Report message communicated to the control-plane element.

15. The media of claim 11, wherein the execution causes the processor to perform further operations, comprising:

determining, by the user-plane element, a termination or deletion of the particular packet flow associated with the subscriber; and sending a communication to the control-plane element that indicates that restoration information associated with the particular packet flow is to be removed at the control-plane element.

16. The media of claim 11, wherein the execution causes the processor to perform further operations, comprising:

determining, by the user-plane element, an updated classification for the particular packet flow associated with the subscriber; and sending a communication to the control-plane element to update the restoration information associated with the particular packet flow.

17. A user-plane element comprising:

at least one memory element for storing data; and at least one processor for executing instructions associated with the data, wherein executing the instructions causes the user-plane element to perform operations, comprising:

obtaining, by the user-plane element, restoration information for one or more packet flows from a control-plane element, wherein the restoration information for the one or more packet flows is obtained via a session establishment request message obtained from the control-plane element;

receiving, by the user-plane element, at least one data packet of a particular packet flow associated with a subscriber, wherein the at least one data packet is received following a failure of the user-plane element or another user-plane element that previously handled the particular packet flow associated with the subscriber;

determining, by the user-plane element, whether particular restoration information associated with the particular packet flow is stored at the user-plane element; and in response to determining that the particular restoration information associated with the packet flow is stored at the user-plane element, applying one or more policies to the packet flow, wherein the restoration information comprises a last matched rule for the particular packet flow that was determined prior to the failure of the user-plane element or the another user-plane element that previously handled the particular packet flow associated with the subscriber.

18. The user-plane element of claim 17, wherein executing the instructions causes the user-plane element to perform further operations, comprising:
  in response to determining that the restoration information associated with the particular packet flow is not stored at the user-plane element, determining a classification for the particular packet flow, wherein the classification is based on rule information stored on the user-plane element.

19. The user-plane element of claim 17, wherein the restoration information comprises:
  flow information identifying one or more of: a source address, a source port, a destination address, a destination port, a protocol, or a flow identifier associated with the particular packet flow; and
  at least one of: a rule name or a rule identifier that indicates the last matched rule associated with the particular packet flow; an application identifier that indicates an application associated with the particular packet flow; or an application instance identifier that is associated with the application.

20. The user-plane element of claim 17, wherein executing the instructions causes the user-plane element to perform further operations, comprising:
  determining, by the user-plane element, an updated classification for the particular packet flow associated with the subscriber; and
  sending a communication to the control-plane element to update the restoration information associated with the particular packet flow.

* * * * *